United States Patent
Moran et al.

(10) Patent No.: US 7,340,249 B2
(45) Date of Patent: Mar. 4, 2008

(54) USE OF RADIO DATA SERVICE (RDS) INFORMATION TO AUTOMATICALLY ACCESS A SERVICE PROVIDER

(75) Inventors: Thomas Joseph Moran, Galway (IE); James Harkin, Galway (IE); Neil O'Connor, Galway (IE); Paul Enright, Galway (IE); Thomas Macnamara, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 521 days.

(21) Appl. No.: 10/091,072

(22) Filed: Mar. 5, 2002

(65) Prior Publication Data

US 2004/0203406 A1    Oct. 14, 2004

(51) Int. Cl.
*H04Q 7/20*    (2006.01)
(52) U.S. Cl. .............................. 455/426.1; 455/186.1; 455/3.05; 455/3.06
(58) Field of Classification Search ............. 455/184.1, 455/185.1, 186.1, 466, 3.01, 3.02, 3.03, 3.04, 455/3.05, 412.1, 412.2, 3.06
See application file for complete search history.

(56) References Cited

U.S. PATENT DOCUMENTS

| 6,507,643 | B1 * | 1/2003 | Groner | 379/88.14 |
| 6,628,928 | B1 * | 9/2003 | Crosby et al. | 455/77 |
| 6,799,201 | B1 * | 9/2004 | Lee et al. | 709/217 |
| 7,062,222 | B2 * | 6/2006 | Boda et al. | 455/3.05 |
| 2002/0049037 | A1 * | 4/2002 | Christensen et al. | 455/3.06 |
| 2002/0083178 | A1 * | 6/2002 | Brothers | 709/226 |
| 2002/0183102 | A1 * | 12/2002 | Withers et al. | 455/575 |
| 2003/0069032 | A1 * | 4/2003 | Jarvi et al. | 455/466 |

FOREIGN PATENT DOCUMENTS

WO    WO01/45308 A2    6/2001

OTHER PUBLICATIONS

RDS—Radio Data System, printed Feb. 25, 2005.

* cited by examiner

*Primary Examiner*—Sanh D. Phu
(74) *Attorney, Agent, or Firm*—Barnes & Thornburg LLP

(57) ABSTRACT

Wireless terminals such as mobile phones which provide cellular communications for example for telephony and short message service (SMS) are well known and more recently such terminals are also able to provide FM radio reception. RDS information received at such a terminal is used to access a service provider via any suitable medium e.g. email, fax, telephone, SMS message, etc. This enables the end user to access the service provider quickly and effectively for example, to purchase a copy of a record heard on the radio or to request information about a product advertised on the radio. Also, the service provider is able to deal with the user interaction effectively because the RDS information can be used to assess the user's requirements for the transaction in advance. In a preferred example, the service provider comprises a contact center such as a call center and the RDS information is used to allocate an appropriate call center agent.

13 Claims, 4 Drawing Sheets

Template format for RDS Data

USE OF RADIO DATA SERVICE (RDS) INFORMATION TO AUTOMATICALLY ACCESS A SERVICE PROVIDER

FIELD OF THE INVENTION

The present invention relates to a method and apparatus for automatically accessing a service provider on the basis of radio data service (RDS) information received from a radio frequency broadcast. The invention is particularly related to but in no way limited to accessing a contact centre using RDS information.

BACKGROUND TO THE INVENTION

Radio Data System (RDS) is a method whereby data is broadcast together with FM or VHF radio signals. RDS radio receivers are then able to extract and use that data, which may for example be information about the frequencies of nearby transmitters, the current time and date, text such as the name of the current programme, the title of a record or a phone-in-number, or a code such as a programme type code, (e.g. news, sport, drama). The RDS contains data about the frequencies of nearby transmitters and is able to automatically retune to the strongest signal without the need for action by the user. This is especially useful for car radios which automatically retune themselves when travelling between different transmitter coverage areas.

Wireless terminals such as mobile phones which provide cellular communications for example for telephony and short message service (SMS) are well known and more recently such terminals are also able to provide FM radio reception. It is sought to provide a means whereby these two technologies, RDS and wireless terminals with FM radio reception can be advantageously used in conjunction with one another.

One problem with radio programme broadcasts is that listeners often fail to hear all information, for example if the listener is carrying out another task as well as listening, if the reception is poor or if the information is detailed and complex. A particular example of this is when a listener hears a song on the radio but fails to hear the name of the artist or tune when it is announced. Previously, this problem has been addressed by using the RDS system. The broadcaster issues short radio text messages to RDS radio receivers using the RDS system. These radio text messages can then be displayed on the RDS radio receiver's visual display such that the name of the record is shown whilst that record is broadcast. However, one problem with this is that the listener may require more information than it is practical to include in the radio text message. Also, once the listener has access to the title of the record, he or she may wish to take other actions using that information, such as buy a copy of the record or send the information to a personal database. In order to take such further actions the listener typically needs to re-enter the information to another system which is time consuming and complex. For example, the listener may then wish to access the internet, and make a purchase of the record from an on-line sales service.

Philips have also addressed the problem of identifying songs heard on the radio. However the Philips method does not involve using the RDS system. Instead a user holds his or her mobile telephone handset near to a radio which is broadcasting a song. The mobile telephone transmits the played song to a service provider on the internet which analyses the sound and compares it with a database of pre-configured information about songs. When a match is found information from the database about the song is accessed and sent back to the mobile telephone in a text message. This is disadvantageous because the user needs to hold the telephone handset next to the radio which may not always be practical. Also, the process of finding the correct information in the database is complex because actual sound has to be analysed.

It has also been proposed to use RDS information to facilitate transfer between radio programme broadcasts over the conventional FM system and those same broadcast over the internet. This is described in International Patent Application number WO 01/45308 published on 21 Jun. 2001 and corresponding U.S. patent application Ser. No. 09/461,454, which are both assigned to Nortel Networks. That document is concerned with user terminals capable of receiving conventional radio frequency public broadcast signals and internet broadcast channels. In one embodiment the user terminal receives conventional radio broadcast signals where possible but if reception is poor, switches to the corresponding internet broadcast. RDS data is broadcast with the radio signals identifying an internet channel associated with the radio frequency broadcast channel. The user terminal switches to an internet broadcast mode and makes a connection with a mobile telephony basestation whereby to continue to receive the same broadcast channel, but by means of the internet accessed via a radio link. In the reverse situation, the internet broadcast contains details of frequencies for a corresponding radio broadcast signal. In another embodiment the user terminal simultaneously receives a radio frequency broadcast channel and information from the internet. The broadcast signals continue to provide audio output while an internet download is used to display graphical/textual information (e.g. currently-playing track details, or adverts with the optional capability to order online, etc.). Whilst the systems described in WO 01/45308 provide fully workable arrangements the present invention extends the work described in that document.

An object of the present invention is to provide a method and apparatus for automatically accessing a service provider which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of automatically accessing a service provider on the basis of radio data service (RDS) information provided in a pre-specified template format and received from a radio frequency broadcast said method comprising the steps of:
  receiving said radio frequency broadcast using an RDS radio receiver and extracting said RDS information on the basis of said pre-specified template format;
  creating a message on the basis of at least some of said RDS information; and
  sending said message to the service provider using either a pre-specified address or an address provided in the RDS information.

For example, the service provider may be web-based and accessible via the internet or may be a traditional telephony based call-centre via which customers are able to purchase mail order goods or other services. In a particular example, a user listens to his or her favourite radio show and hears a song that he or she wishes to purchase. This particular example is concerned with a song played on the radio although the invention is applicable to any type of radio content. The user's terminal is able to create a message containing RDS information which identifies the song for example. That message can then be automatically sent to a web-based music sales entity to purchase the song. In this way a relationship is established between a radio broadcast event and a customer enquiry or transaction. This provides advantages both for the end user, who is able to quickly, easily and effectively purchase the song, and also for the music sales entity, which is able to increase its volume of sales and to improve the speed and efficiency with which each sales transaction is made. End users are encouraged to access the wireless internet for example, without the need to type in information such as URLs or product identifiers.

In one example, the RDS information is associated with an advertising campaign. In that case, the RDS information is advantageously used to link customer contacts with a particular advertising campaign.

From the end user's (or consumer's) perspective it is simpler to purchase a product or request more information about a product advertised on the radio. In the case of music content, usually the radio station does not immediately provide information about specific records played (or there is a significant delay in provision of this information). This invention enables such information to be made available instantly and allows customers to act on that information immediately.

From the music distributor's perspective, the invention harnesses the marketing of a music product via radio and links it directly to a simple ordering mechanism thus greatly increasing revenues for the distributor or record companies and ultimately the artists themselves.

From the radio station's perspective a source of revenue is also offered. The marketing source of any sales or other customer contacts is available via the RDS information and this used to evaluate the performance of different radio stations with respect to customer sales and contacts. This aids the radio stations when developing commercial agreements with advertisers or music companies. The invention provides a powerful way of packaging up radio broadcast time units and attacking a unique identifier to each one. For example, advertisers are able using the invention to tell which advert in the last week or month brought about the most sales.

In a preferred example the service provider is a contact centre. Users are quickly and easily able to access the contact centre using this method without having to initiate a separate access request to the contact centre.

The message comprising RDS information is sent to the service provider using a medium selected from: email, telephone or short message service. This communication may be wireless application protocol (WAP) based for example using GPRS or 3G wireless communications. The particular medium used may be automatically selected, according to known requirements of the service provider, or on the basis of the RDS information itself.

The RDS information is provided in a pre-specified template format. This is advantageous, because the process of extracting the RDS information is simplified. This also makes it possible to produce a number of generic applications for use on the terminal itself which make use of the RDS information supplied in the standard template format. In addition, the template format can be tailored for particular contact centre requirements.

In one embodiment the RDS information comprises an identifier which identifies a radio station which provided the radio frequency broadcast; and wherein that RDS information is sent to the service provider. This is advantageous, for example, if the service provider wishes to assess which radio station produces the most customer enquiries.

Preferably the RDS information comprises an identifier associated with audio information provided by said radio frequency broadcast; and wherein that RDS information is sent to the service provider. This is advantageous, for example, when the identifier is associated with a particular song that a customer wishes to purchase. For example, the identifier is associated with any one of a piece of music, an artist, an enterprise, or an advertisement.

In a preferred example, said step (i) of receiving further comprises presenting at least some of said extracted RDS information to a user and receiving an associated user input and wherein said step (ii) of creating a message comprises creating the message such that it comprises information about the user input. For example, the RDS information may be details of a particular song being played on the radio and details of the cost of the song together with contact details for a particular music provider. The user is able to review this information and make a user input indicating that it is required to purchase the song for example.

Thus for example, the information about the user input can comprise any of a request for contact, a request for information associated with the RDS information in the message, or a request to order goods associated with the RDS information.

In the case that the service provider comprises a contact centre the method preferably comprises the steps of, at the contact centre receiving said message, extracting said RDS information from the message and routing the message to one of a plurality of contact centre agents on the basis of said RDS information. This provides the advantage that the customer is automatically routed to an appropriate call centre agent which a skill-set suited to the requirements of the customer, as judged on the basis of at least the RDS information. This is advantageous for the end user who does not need to navigate a complex menu system or other user interface at the call centre. There are also advantages from the point of view of the call centre provider, because the load on the call centre routing system is reduced and the overall transaction time reduced.

In one example the RDS information extracted from the message comprises information about the origination of the RDS information and wherein that information is stored. This information can be used advantageously, for example, for marketing purposes and may comprise time information. Thus service providers are able to assess the most effective times and radio stations from which RDS information is broadcast.

The invention also encompasses a user terminal arranged to automatically access a service provider on the basis of radio data service (RDS) information provided in a pre-specified template format and received from a radio frequency broadcast said user terminal comprising:
   an RDS radio receiver arranged to receive said radio frequency broadcast and to extract said RDS information on the basis of said pre-specified template format;
   a processor arranged to create a message on the basis of at least some of said RDS information; and
   an output arranged to send said message to the service provider using either a pre-specified address or an address provided in the RDS information.

For example, the user terminal may be selected from: a mobile telephone, a personal computer, a personal digital assistant and a lap-top computer.

According to another aspect of the present invention there is provided a contact centre comprising at least one input arranged to receive messages comprising RDS information, a plurality of contact centre agents and a router arranged to route messages from the input to the contact centre agents and wherein said contact centre further comprises a processor arranged to extract RDS information from the messages and wherein said router is arranged to route said messages to the contact centre agents at least partly on the basis of the extracted RDS information.

According to another aspect of the present invention there is provided a computer program which is preferably stored on a computer readable medium and which is arranged to control a contact centre as described above such that the following steps are performed:

messages comprising RDS information are received;
RDS information is extracted from the received messages;
the messages are routed to the contact centre agents at least partly on the basis of the extracted RDS information.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
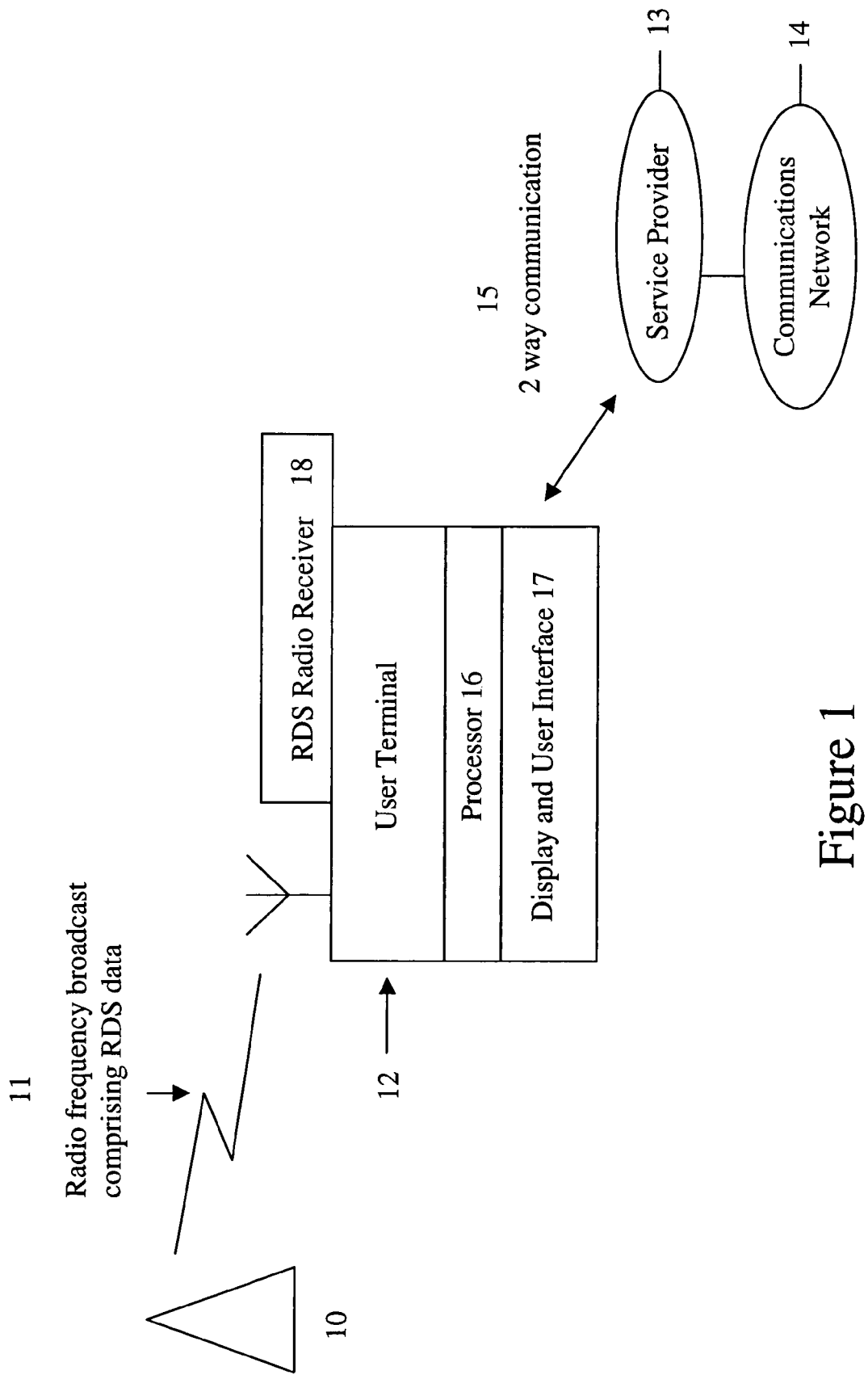
FIG. 1 is a schematic diagram of a user terminal arranged to automatically access a service provider on the basis of RDS information.

FIG. 1 is a schematic diagram of a user terminal 12 arranged to automatically access a service provider on the basis of RDS information. The user terminal 12 has an RDS radio receiver 18 which may be any suitable type of RDS radio receiver as known in the art. Thus the user terminal is able to receive radio frequency broadcasts 11 comprising RDS data from a broadcast station 10.

The user terminal also has a processor 16 and a user interface 17 which is provided in any suitable form, for example, with a visual display and a key pad. In addition, the user terminal has means for two-way communications 15 with a service provider 13 that is connected to a communications network 14. For example, the user terminal may be a mobile telephone which is able to make a connection with a mobile telephony basestation and from there access the internet or any other communications network associated with the basestation. Alternatively, the user terminal may be physically connected to communications network 14. For example, the user terminal can be a personal computer connected to an enterprise data network which is in turn connected to communications network 14.

Figure 2:
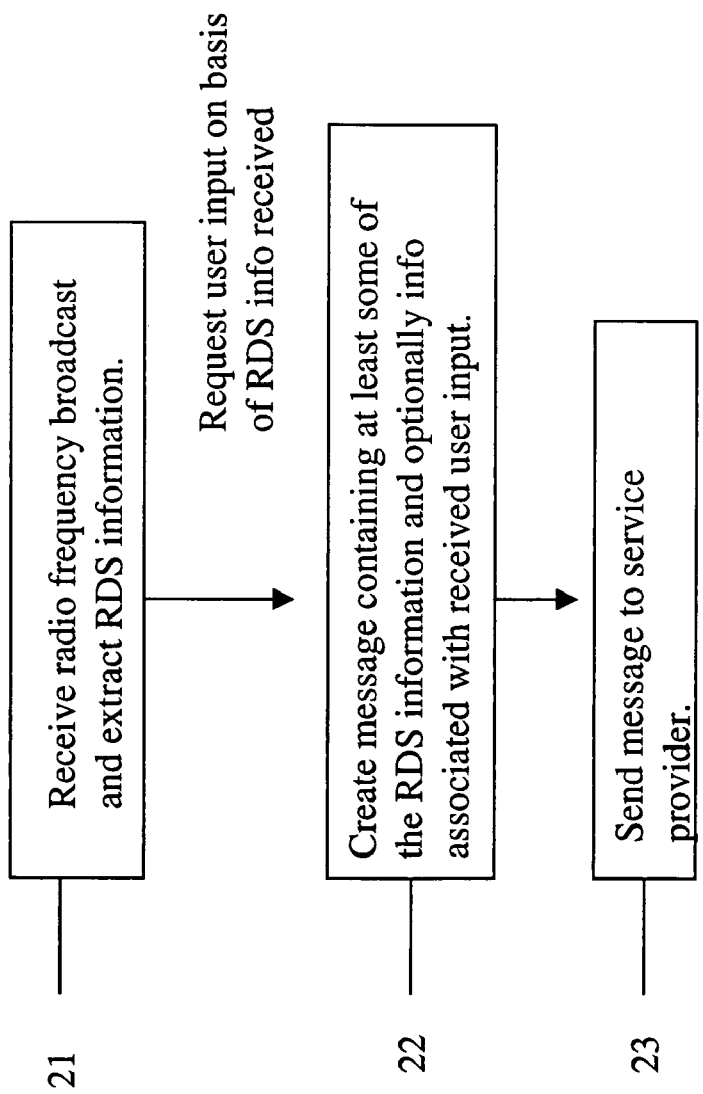
FIG. 2 is a flow diagram of a method carried out by the user terminal of FIG. 1 in order to automatically access a service provider.

FIG. 2 is a flow diagram of a method carried out by the user terminal of FIG. 1 in order to automatically access a service provider. At the user terminal 12 a radio frequency broadcast 11 comprising RDS data is received (see box 21 of FIG. 2). The RDS radio receiver 18 receives the broadcast and extracts the RDS information as known in the art. For example, the RDS information comprises the song details for a particular song played on the broadcast together with information about the time that song was broadcast, the radio station that made the broadcast, and the address of a service provider that is selling copies of the song.

Preferably the user terminal extracts the RDS data and stores this in a non-volatile memory buffer using a last-in first-out type implementation for example. As the user is listening to the radio, the buffer is continually updated with RDS information associated with music played, advertisements broadcast or other events broadcast.

In a preferred example, the user terminal 12 is arranged to present the RDS information to the user, for example, using a visual or audio display mechanism, and the user is able to make a response or input to the terminal. For example, that response or user input could be arranged to indicate that more information about the song is requested, or that the user wishes to purchase a copy of the song. However, it is not essential that the user terminal 12 presents the RDS information to the user.

The processor 16 of the user terminal then creates a message (see box 22) and sends this message to the service provider 13 (see box 23 of FIG. 2). Any suitable medium is used for the message. For example, short message service (SMS) email, telephone, etc. any of which may be provided using WAP based communications, GPRS or 3G.

In a preferred example, the message comprises at least some of the extracted RDS information. The message may also comprise information about any user input associated with the RDS information. For example, if the user makes an input to state that he or she wishes to purchase a copy of the song then the message sent to the service provider preferably contains a purchase request together with RDS information identifying the song. Other requests could be for a fax-back service, or asking for a call-back.

In order to send the message to the service provider, the user terminal needs to know the address of the service provider 13. This information can be pre-configured at the user terminal 12 or provided via the RDS information. For example, if the service provider is web-based the RDS information can contain a universal resource locator (URL) for the particular web-site involved. Alternatively, the address information may comprise a fax number or a telephone number.

When the service provider receives the message it either has direct access to RDS information in that message, or it has indirect access to RDS information as explained below. Any resulting transaction that occurs between the user and the service provider is thereby speeded up and simplified because the user is automatically connected to the service provider without the need for complex actions by the user.

The service provider may have indirect access to RDS information as now explained. For example, the radio broadcast RDS information comprises a particular telephone number for a service provider. That telephone number is extracted by the user terminal and used to place a call to the service provider. Because that service provider has several different telephone numbers it is able to tell that all calls made to one particular one of its telephone numbers should be dealt with in a particular manner. For example, all such calls could be related to a particular advert broadcast on the radio. In this case, a call set up request made to the particular telephone number of the service provider comprises RDS information indirectly because it is made to the particular telephone number.

Figure 3:
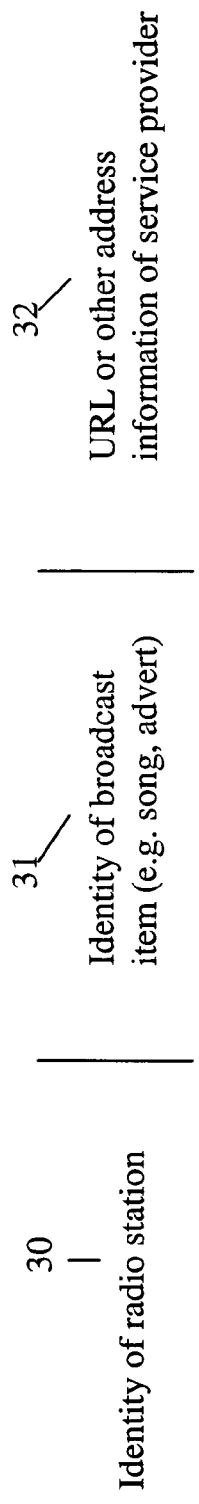
FIG. 3 is a schematic diagram of a template format for RDS data.

In a preferred embodiment the RDS data broadcast by the radio frequency broadcaster 10 is provided according to a specified format. The RDS data is contained in a template structure such as that illustrated in FIG. 3. This shows three sections of RDS data, each no larger than a specified maximum size and arranged in series as illustrated in FIG. 3. In the example illustrated in FIG. 3 the RDS template comprises a first field 32 of specified size, which is arranged to hold address details for the service provider. A second field 31 is arranged to hold information about the identity of the song, advert or other broadcast item. Finally a third field 30 holds information about the identity of a radio station which broadcast the RDS information. By using a specified template structure for the RDS data, this data is easier to extract from the radio frequency broadcast and is also in a suitable form for further use by the service provider.

In a particularly preferred embodiment the service provider is a contact centre, where a "contact centre" is an entity arranged to receive queries from users and to respond to those queries. For example, a telephone help desk, a telephone ticket sales agency or a web-based music sales service. A contact centre has a plurality of contact centre agents which are arranged to formulate and send responses to the queries. For example, the contact centre agents may be fully automated or may be partially automated comprising a terminal and processor for use by a human operator. The contact centre agents typically have different skill-sets with some contact centre agents being arranged to perform particular types of task that differ from those of other contact centre agents. A particular problem associated with contact centres concerns how best to route incoming queries between the available contact centre agents in order to obtain the fastest, highest quality responses whilst at the same time minimising the number of contact centre agents required. In a preferred embodiment the present invention addresses this problem by making use of RDS information.

Figure 4:
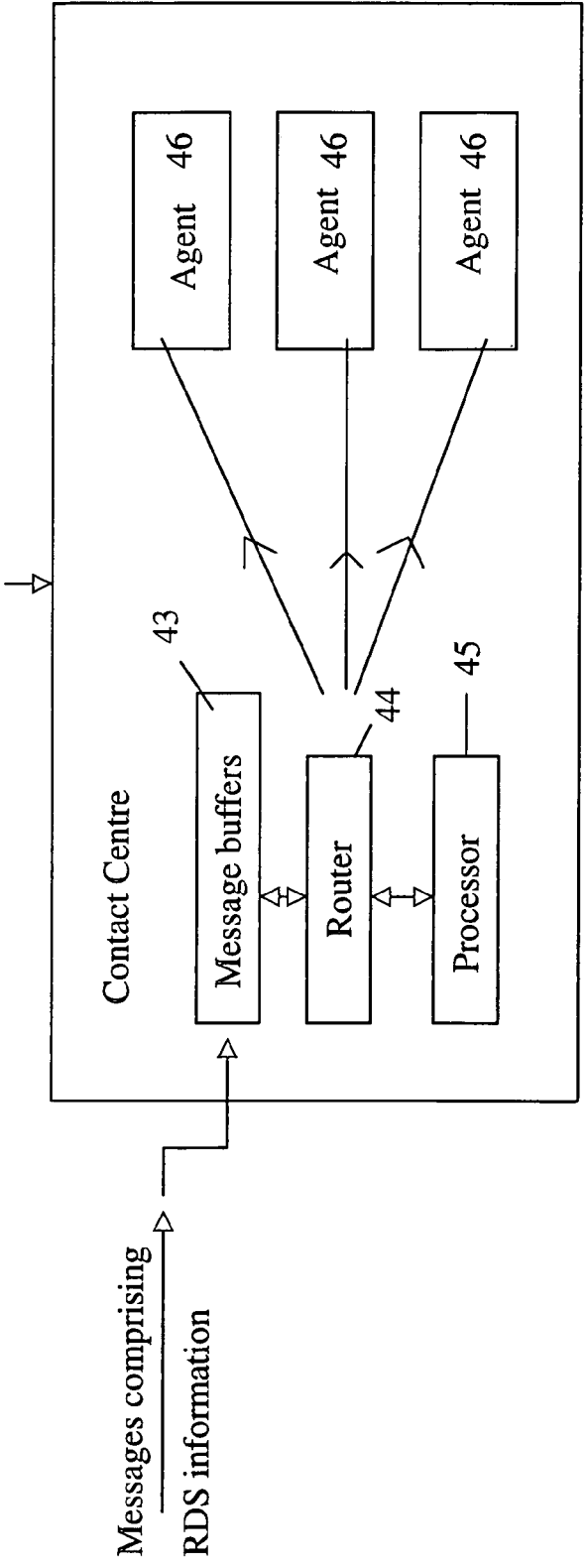
FIG. 4 is a schematic diagram of a contact centre arranged to receive RDS information.
Figure 5:
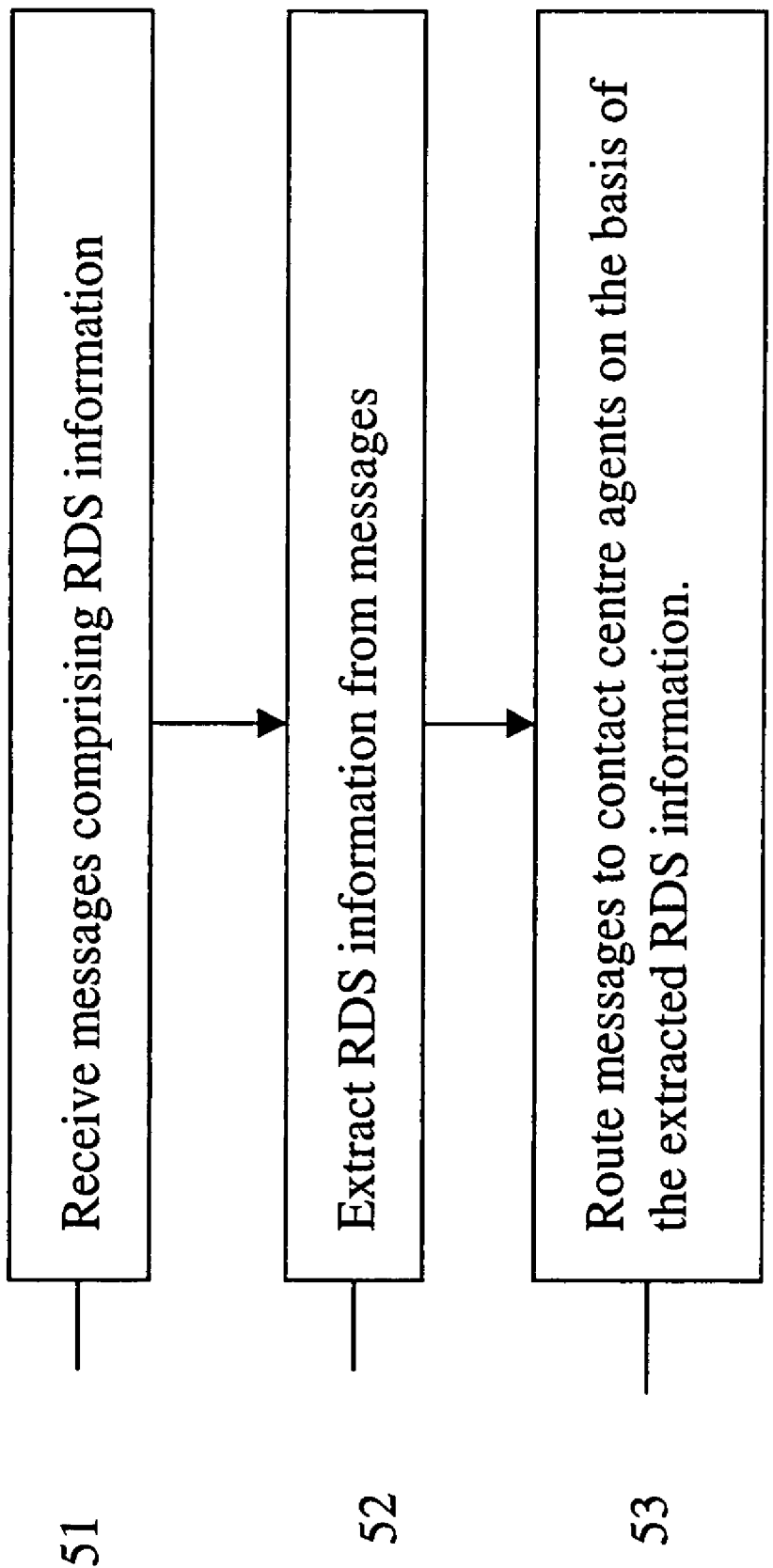
FIG. 5 is a flow diagram of a method of routing messages to contact centre agents on the basis of RDS information.

FIG. 4 is a schematic diagram of a contact centre arranged to receive RDS information. Messages from users comprising RDS information reach the contact centre 41 and are stored in message buffers 43. As mentioned earlier, the RDS information may be directly contained in the messages or may indirectly provided, for example, by the choice of telephone number or other address used to send the message to. A router 44 then allocates or routes the messages from the buffers 43 to contact centre agents 46. In order to improve the manner in which the messages are routed, RDS information is extracted from the messages (when it is directly contained in those messages see boxes 51 and 52 of FIG. 5) and taken into account by a processor 45. That processor also has access to information about the skill-sets of each agent and optionally information about how busy each of those agents are at present. Using this information together with the RDS information the processor determines which particular call centre agent 46 a particular message should be routed to. For example, if the RDS information is associated with a particular advertisement campaign, the incoming message may be routed to one of a subset of the agents which have a skill-set appropriate for that advertising campaign. In the situation that the RDS information contains time and/or date information the contact centre is also able to relate a particular customer enquiry or order to a specific instance of an advertisement or other radio broadcast event. In the case that RDS information is indirectly contained in the message, the message is routed to a call centre agent on the basis of information about the address that the message was sent to.

Music Delivery Application

Considering a particular example in which the service provider is a music distributor. A user has a dual mode wireless terminal which allows them to make voice calls and send text messages. In addition, the terminal has an FM radio and headset. The user is listening to the radio and hears a piece of music that they like. By simply clicking a button on the wireless terminal they automatically place an order for this item of music. The music content is then automatically ordered by the user from their music distributor of choice and delivered to the user in a pre-defined format (e.g. MP3 file, CD, etc.) by a pre-defined delivery mechanism (e.g. email, post, direct MP3 download to the wireless terminal, etc.). For CD delivery, again the method of packaging could be predefined by the user, for example they could have a default agreement with the music distributor that simply 'fills up' the CD capacity and only then is the CD delivered (e.g. after say 75 minutes of content have been selected). Many options can be offered to the user. For example, they could also choose to simply store the ID of the music content they are listening to with the intention of ordering it later, sending the ID via text message to their friends or even 'texting' a request back into the radio station.

The user interface at the user terminal is preferably arranged to offer the option to perform actions such as "ORDER" or "STORE". In the case of the "ORDER" option, the user could have pre-configured the terminal with information that identifies their music supplier of choice. For example, this is in the form of an SMS address or email address for the music supplier.

When the user selects the "ORDER" option, the terminal automatically creates and sends a message via SMS (or any other suitable medium) which has as part of its content RDS information which identifies the piece of music required. The RDS information also specifies a specific keyword such as "ORDER" and optionally the identity of the radio station.

The music distributor receives the message and parses it to extract the RDS information and in addition obtains a calling identity from the message to identify the end user. Depending on any pre-defined format and delivery mechanism the receiving system then takes the appropriate action. For example, this comprises an automatic acknowledgement of the order via SMS or email and optionally offers a call back to the user with more information.

Radio Advertising Application

Considering another particular example in which RDS information comprises a unique identifier for an advertisement. Just as we have a unique identifier for a piece of music content, it is also possible to apply the same concept to advertisements. (e.g. a product ID, company ID, etc.) In this case the user will have a number of options available such as 'REQUEST MORE INFO' or 'CALL ME' that they can enter in response to an advertisement they have just heard on the radio. On a terminal that has web browsing capability, there is also an option to set up an internet connection to the appropriate web site.

In this example, the user is able to select options such as "SEND ME MORE INFORMATION" or "CALL ME". Also, the RDS information should specify where the user message is to be sent. This could be an SMS call centre owned by the vendor of the product being advertised or could be a call centre that is set up to specifically deal with multiple products/vendors. If the terminal is web-enabled (e.g. a WAP phone/2.5G/3G device) then a URL is provided in the RDS data and that URL input to the terminal's microbrowser in the event that the user selects an option such as "ACCESS WEB SITE".

In general the invention is applicable to any type of radio content and also to any chunk of 'radio time' that might potentially require a response from a user. (e.g. could be a 'call in show', voting mechanism, etc.). For example the method also applies to talk shows, where users simply want to call in. In this case, the RDS information is simply the dial-in telephone number, and again the terminal extracts that information from the RDS data stream and uses it in initiating a phone call.

In another embodiment the message sent from the terminal to the service provider further comprises at least some of the actual audio stream from a radio station. This is preferably in addition to RDS information and user data. For example, the user terminal stores a segment of incoming audio data from the radio broadcast. This is then sent to a predefined service provider which identifies the segment and responds to the user terminal on the basis of that identification.

Any range or device value given herein may be extended or altered without losing the effect sought, as will be apparent to the skilled person for an understanding of the teachings herein.

The invention claimed is:

1. A method of automatically accessing a service provider on the basis of radio data system (RDS) information provided in a pre-specified template format and received as an encoded RDS data signal which is carried in conjunction with the normal encoded audio radio signal from a radio frequency broadcast, said service provider being a contact centre which comprises a contact routing mechanism for receiving and routing incoming contacts, and a plurality of human operators to which said incoming contacts can be routed by said routing mechanism to enable said human operators to respond to said contacts, said method comprising the steps of:
   (i) receiving said radio frequency broadcast using an RDS radio receiver and extracting said RDS information on the basis of said pre-specified template format;
   (ii) creating a message on the basis of at least some of said RDS information;
   (iii) sending said message to the contact centre using either a pre-specified address or an address provided in the RDS information;
   (iv) receiving said message at the contact centre;
   (v) extracting said RDS information from the message; and
   (vi) routing the message to one of a plurality of human contact centre operators on the basis of said RDS information.

2. A method as claimed in claim 1 wherein said message is sent to the contact centre using a medium selected from: email, telephone and short message service.

3. A method as claimed in claim 2 wherein said medium is provided using any of wireless application protocol (WAP), general packet radio service (GPRS) and third generation (3G) communications.

4. A method as claimed in claim 1 wherein said RDS information comprises an identifier which identifies a radio station which provided the radio frequency broadcast.

5. A method as claimed in claim 1 wherein said RDS information comprises an identifier associated with audio information provided by said radio frequency broadcast.

6. A method as claimed in claim 5 wherein said identifier is associated with any one of a piece of music, an artist, an enterprise, or an advertisement.

7. A method as claimed in claim 1 wherein said step (i) of receiving further comprises presenting at least some of said extracted RDS information to a user and receiving an associated user input and wherein said step (ii) of creating a message comprises creating the message such that it comprises information about the user input.

8. A method as claimed in claim 7 wherein said information about the user input comprises any of a request for contact, a request for information associated with the RDS information in the message, or a request to order goods associated with the RDS information.

9. A method as claimed in claim 1 wherein said RDS information extracted from the message comprises information about the origination of the RDS information and wherein that information is stored.

10. A method as claimed in claim 9 wherein said information about the origination of the RDS information comprises an identifier for a radio station which provided the radio frequency broadcast.

11. A method as claimed in claim 10 wherein said information about origination comprises time information.

12. A user terminal arranged to automatically access a contact centre on the basis of radio data system (RDS) information provided in a pre-specified template format and received as an encoded RDS data signal which is carried in conjunction with the normal encoded audio radio signal from a radio frequency broadcast said user terminal comprising:
   (i) an RDS radio receiver arranged to receive said radio frequency broadcast and to extract said RDS information on the basis of said pre-specified template format;
   (ii) a processor arranged to create a message on the basis of at least some of said RDS information, whereby said RDS information allows the message to be routed by a routing mechanism of the contact centre to a suitable human operator within the contact centre, thereby enabling an operator to respond to said message;
   (iii) an output arranged to send said message to the contact centre using either a pre-specified address or an address provided in the RDS information.

13. A user terminal as claimed in claim 12 which is selected from: a mobile telephone, a personal computer, a personal digital assistant and a lap-top computer.

* * * * *